(12) United States Patent
Lloyd

(10) Patent No.: US 7,581,912 B2
(45) Date of Patent: Sep. 1, 2009

(54) FASTENER HAVING A VANED SHAFT

(76) Inventor: Jeff Lloyd, 3107 SW. Williston Rd., Gainesville, FL (US) 32608

( * ) Notice: Subject to any disclaimer, the term of this patent is extended or adjusted under 35 U.S.C. 154(b) by 429 days.

(21) Appl. No.: 11/487,640

(22) Filed: Jul. 17, 2006

(65) Prior Publication Data
US 2007/0212197 A1    Sep. 13, 2007

Related U.S. Application Data

(60) Provisional application No. 60/779,795, filed on Mar. 7, 2006.

(51) Int. Cl.
F16B 15/00    (2006.01)
(52) U.S. Cl. .............. 411/487; 411/492; 411/451.4
(58) Field of Classification Search ............ 411/922, 411/71, 487, 486, 488, 492, 451.4
See application file for complete search history.

(56) References Cited

U.S. PATENT DOCUMENTS

| | | | |
|---|---|---|---|
| 18,294 A | 9/1857 | Newton | |
| 259,382 A * | 6/1882 | Goldie | 411/487 |
| 303,944 A * | 8/1884 | North | 411/451.4 |
| D24,761 S | 10/1895 | Howard | |
| 550,795 A | 12/1895 | Markoe | |
| 689,916 A * | 12/1901 | Sapp | 411/452 |
| 778,858 A | 1/1905 | Higgins | |
| 942,668 A * | 12/1909 | Smith | 411/487 |
| 945,543 A | 1/1910 | Jarvis | |
| 985,519 A * | 2/1911 | Flanagan | 411/451.4 |
| 1,069,792 A * | 8/1913 | Kruttschnitt | 411/451.4 |
| 1,430,758 A * | 10/1922 | Russell | 411/451.4 |
| 1,716,019 A * | 6/1929 | Williams | 411/452 |
| 1,725,118 A | 8/1929 | Williams | |
| 2,940,081 A | 6/1960 | Juilfs | |
| 3,152,334 A | 10/1964 | Lingle | |
| 3,481,459 A | 12/1969 | Becht | |
| 3,696,701 A | 10/1972 | Readyhough | |
| 3,835,991 A | 9/1974 | Brecht | |
| 3,861,526 A | 1/1975 | Leistner | |
| 3,935,945 A | 2/1976 | Smith et al. | |
| 4,002,098 A | 1/1977 | Colechia | |
| 5,143,501 A | 9/1992 | Leistner et al. | |
| 7,097,403 B1 | 8/2006 | Seace | |

* cited by examiner

*Primary Examiner*—Gary Estremsky
(74) *Attorney, Agent, or Firm*—Saliwanchik, Lloyd & Saliwanchik

(57) ABSTRACT

Described is a fastener having a longitudinal shank designed with a central cross-member; two arms, one at each end of the cross-member; each arm having a forward vane and a rearward vane, the vanes extending longitudinally along at least most of the length of the shank. A flattened head is at one end of the shank, and a pointed end at the other. The head may be notched for ease in collating the fasteners.

12 Claims, 3 Drawing Sheets

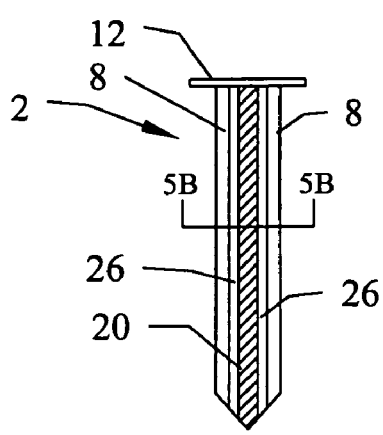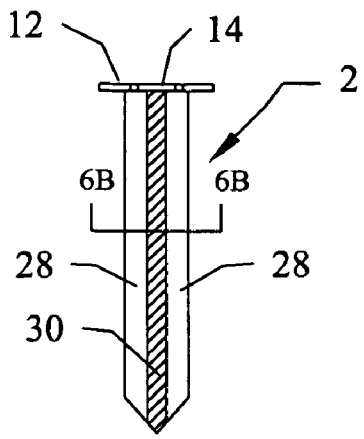
FIG. 5A  FIG. 6A
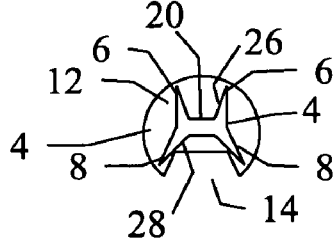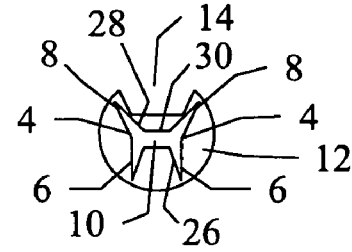
FIG. 5B  FIG. 6B
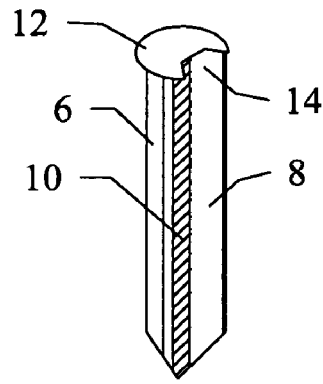
FIG. 7
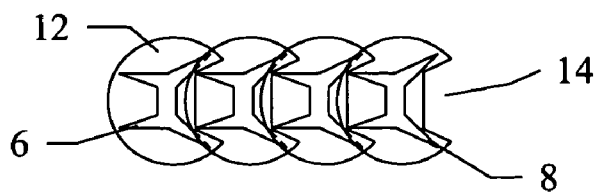
FIG. 8

FASTENER HAVING A VANED SHAFT

The present application claims the benefit of U.S. Provisional Application Ser. No. 60/779,795, filed Mar. 7, 2006, the disclosure of which is incorporated herein by reference in its entirely.

BACKGROUND OF INVENTION

There are numerous types of fasteners with hundreds of uses that are well-known in the art. Common problems with large volumes of certain types of fasteners, for example conventional cylindrical or round-shafted nails, are the weight of the manufacturing materials and the associated high costs of starting materials and costs of transport. In an effort to overcome these problems, a number of varieties of fasteners with grooved or radiating shafts have been developed with the hope that less starting material might be required, resulting in a product with lighter weight and still retaining acceptable strength. Some of these fasteners are particularly designed to be collated for use with automatic hammers or nail guns. One example of such fasteners is disclosed in U.S. Pat. No. 4,815,910 to Potucek. Potucek's fasteners are grooved with vanes radiating from around a cylindrical central core. Although they are strong and light weight, the manufacturing of these fasteners can be cost prohibitive and time-consuming. In addition, the traditional methods of manufacturing such fasteners often cause considerable and unacceptable wear on the machine parts, requiring more frequent repair and/or replacement of the manufacturing equipment. There is thus a need for fasteners having alternative shaft designs.

BRIEF SUMMARY

The fastener of the subject invention provides a shaft design with a central cross-member that overcomes certain problems of currently known grooved or radiating shaft fasteners, while also retaining benefits over conventional cylindrical-shanked fasteners such as nails. By virtue of its central cross-member with vanes extending from each edge of the cross-member, the subject fasteners can be made from metal ribbon, if desired. The subject design reduces weight and volume as compared to conventional cylindrical-shanked nails of similar dimensions by requiring less manufacturing materials, and has improved resistance to shaft bending. The vaned shaft of the subject invention has improved surface area, better rigidity, better penetration, and more holding power in most materials than standard cylindrical or "round-shank" nails. Further, the subject fastener is particularly useful with wood applications because the shaft, or "shank," tends to slice through wood fibers, thereby reducing undesirable wood splitting and the resulting waste of lumber, and makes it generally easier to penetrate most materials. It is also contemplated that certain embodiments of the subject invention, having relatively few angles, will be easier to manufacture and cause less wear on machinery than some prior art grooved or vaned fasteners.

In one embodiment, a cross-sectional view of the shank somewhat resembles a truncated letter "A". In another exemplary embodiment, the shank cross-section resembles a distorted letter "H", in which the bottom legs appear slightly angled away from each other. A variety of head shapes are possible, as will be readily appreciated. In certain embodiments, if desired, a notch can be manufactured into the flattened head so that the fasteners can be more tightly collated.

All patents, patent applications, provisional applications, and publications referred to or cited herein are incorporated by reference in their entirety, including all figures and tables, to the extent they are not inconsistent with the explicit teachings of this specification.

BRIEF DESCRIPTION OF DRAWINGS

FIG. 5A is an elevational view of the front of a second embodiment of a fastener according to the subject invention.

FIG. 5B is a cross-sectional view taken along line 5B-5B of FIG. 5A, viewed from the point end looking up towards the underside of the head.

FIG. 6A is an elevational view of the back of a second embodiment of a fastener according to the subject invention.

FIG. 6B is a cross-sectional view taken along line 6B-6B of FIG. 6A, viewed from the point end looking up towards the underside of the head.

FIG. 7 is a perspective view of the fastener shown in FIGS. 5A-6B.

FIG. 8 is a plan view of the heads of several collated fasteners according to a second embodiment of the subject invention.

DETAILED DISCLOSURE

The fastener of the subject invention provides a cross-sectional shank design that has improved resistance to shank deformation or bending as compared to conventional round-shank fasteners of similar dimension. Their improved resistance to shank bending means fewer wasted fasteners. The subjection invention requires less material to manufacture, reducing the weight and volume of the fastener as compared to round-shank nails of comparable strength. This is especially useful when collated for use in various tools and devices such as automatic hammers, nail guns, etc. The shank designs of the subject invention further provide substantially greater surface area than standard round-shank nails, which improves resistance to removal or displacement from an object or material. The shank designs of the subject invention further provide relatively easier or more efficient penetration into other objects, work pieces or materials (hereinafter referred to simply as "objects") than conventional round-shank designs, which can make it more useful with wood and/or wood-like materials, as there is less wasted wood because there is less wood lost to splitting.

Figures 1A, 2A:
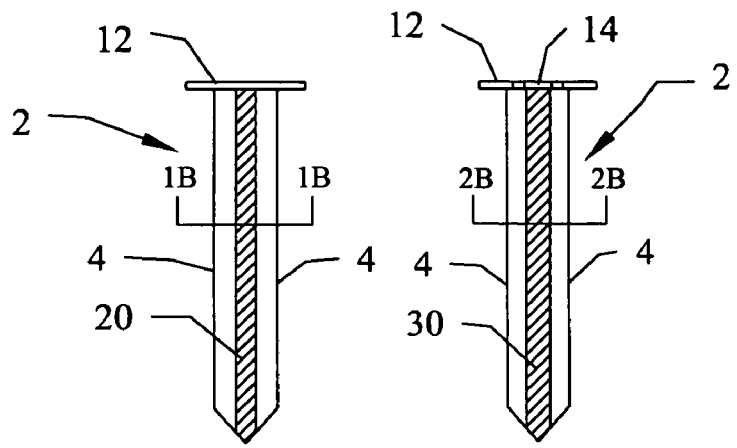
FIG. 1A is an elevational view of the front of a first embodiment of a fastener according to the subject invention.
FIG. 2A is an elevational view of the back of a first embodiment of a fastener according to the subject invention.
Figures 1B, 2B:
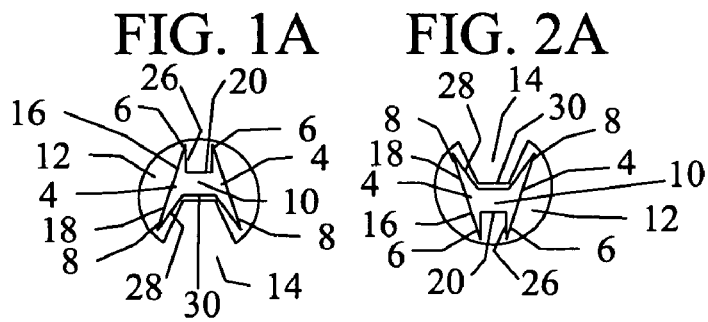
FIG. 1B is a cross-sectional view taken along line 1B-1B of FIG. 1A, viewed from the point end looking up towards the underside of the head.
FIG. 2B is a cross-sectional view taken along line 2B-2B of FIG. 2A, viewed from the point end looking up towards the underside of the head.
Figure 3:
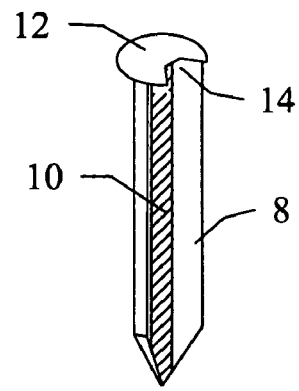
FIG. 3 is a perspective view of the fastener shown in FIGS. 1A-2B.

With reference to the attached figures, which show certain embodiments of the subject invention (not necessarily to scale), it can be seen that the fastener utilizes a shank 2 having a cross-sectional appearance resembling a truncated "A"-shape or a distorted "H"-shape, with two arm members 4 and a cross-member 10 between them, for example, as shown in FIGS. 1B and 2B (the truncated "A"), and in FIGS. 5B and 6B (the distorted "H"). Each arm 4 can be further characterized as comprising a forward vane 6 and rearward vane 8. The distal end of the shank 2 can be sharpened or angled to a point, as required to adequately facilitate penetration into an object, for example, as shown in FIGS. 1A, 2A, 5A, and 6A. The opposite end of the shank has fixedly attached thereto a head 12, preferably of a circumference larger than that of the shank 2 to aid in driving the fastener into another object, and, if necessary or desired, removing the fastener from an object. Each of these features will be discussed and certain details and examples provided, which should not be construed as limiting.

The fastener may comprise any of a variety of one or more appropriate materials, including, but not limited to, metals, plastics, glasses, clays, enamels, and other materials and combinations thereof. A person with skill in the art is able to determine the optimal material(s) for the various circumstances and intended uses for the fastener of the subject invention. In certain preferred embodiments, the fastener of the subject invention comprises one or more metal materials as are well known in the art, such as steel, copper, aluminum, brass, or iron, having sufficient tensile strength to withstand repeated striking with a hammer or similar object, or the forces that may be exerted by an automatic hammer, nail gun, or similar device.

With regard to the shank 2 of the fastener, it can be seen, for example, in FIGS. 1B and 2B, that in cross-section one embodiment of the shank 2 resembles a truncated "A" pattern comprising two arms 4, each arm comprising two blade-like vanes 6 and 8, and connected by a cross-member 10 having a front face 20 and a rear face 30. In various embodiments, the arms 4 can be substantially parallel to each other, at one or more angles to each other, or a combination thereof. Further, one or more of vanes 6, 8 can extend along all or a portion of the length of the shank 2. In a preferred embodiment, vanes 6 and 8 extend along almost the entire length of the shank 2. Alternative embodiments may utilize more or fewer vanes extending from the cross-member 10. In a preferred embodiment, the shank 2 comprises a cross-member 10 with two arms 4, one arm 4 at each elongate edge of the cross-member 10 and extending along the length of the shank, each arm 4 comprising a forward vane 6 and a rearward vane 8.

In addition, the edges of the vanes 6, 8 distal from the cross-member 10 can terminate in any of a variety of shapes, for example, the edges can be tapered, flattened, rounded, grooved, etc. The shape desired for the ends of the vanes can be dependent upon the type of object with which the fastener will be used. A person with skill in the art is readily able to determine the appropriate shape for the edges of the vanes, depending on the intended use and the means of manufacture. However, for most objects, especially those of wood or wood-like materials, it is advantageous to provide a relatively sharp edge so that a somewhat cutting action is accomplished when driving, pressing, or pounding, etc. the fastener into an object. Thus, in certain preferred embodiments, the edges of the vanes 6, 8 are tapered so as to be relatively sharp, for example as shown in the Figures.

Figure 4:
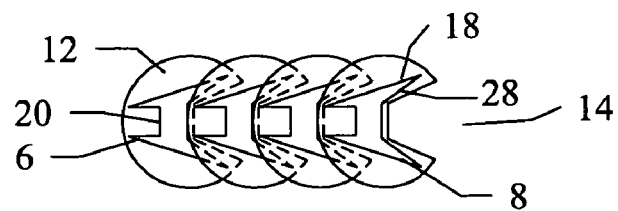
FIG. 4 is a plan view of the heads of several collated fasteners according to a first embodiment of the subject invention.

Referring to the embodiment depicted in FIGS. 1A through FIG. 4, the shank 2 comprises a cross-member 10 having two forward vanes 6 having substantially parallel internal surfaces 26 that extend perpendicularly from cross-member front face 20. In this embodiment, the external surfaces 16 of forward vanes 6, if extended, would form an acute angle. This embodiment also comprises two rearward vanes 8 extending at an angle away from cross-member rear face 30, as shown in FIGS. 1B, 2B, and 4. In this embodiment, each forward vane external surface 16 is substantially co-planar with a rearward vane external surface 18, such that contiguous surfaces 16 and 18 form a 180° angle. Further, the external angles formed by the junction of rearward vane internal surfaces 28 with cross-member rear face 30 are between about 90° and about 150°, and preferably about 120°. In this regard, the cross-sectional view clearly resembles a truncated letter "A".

In alternative embodiments, represented in FIGS. 5A through FIG. 8, the external surfaces 16 of forward vanes 6, if extended, would either be parallel to one another, or would diverge, in contrast to the various embodiments represented by the depictions of FIGS. 1A through FIG. 4. In these embodiments, vanes 6 and 8 are configured such that every external angle defined by a surface junction is an obtuse angle. For example, in this specifically exemplified embodiment, the junction of forward vane internal surface 26 with cross-member front face 20 would form an angle of between about 90° and about 130°, and preferably approximately 105° to about 115°. Further, the junction of rearward vane internal surface 28 with cross-member rearface 30 would form an angle of between about 90° and about 155°, and preferably approximately 135°. Finally, in this exemplified embodiment, the junction of forward vane external surface 16 with rearward vane external surface 18 forms an angle of between about 90° and about 180°, and preferably approximately 155°.

Figure 10:
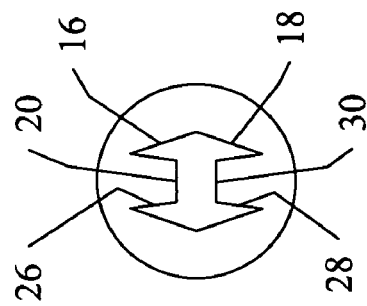
FIG. 10 is a cross-sectional view of yet another embodiment of a fastener according to the subject invention, viewed from the point end looking up towards the underside of the head.
Figure 11:
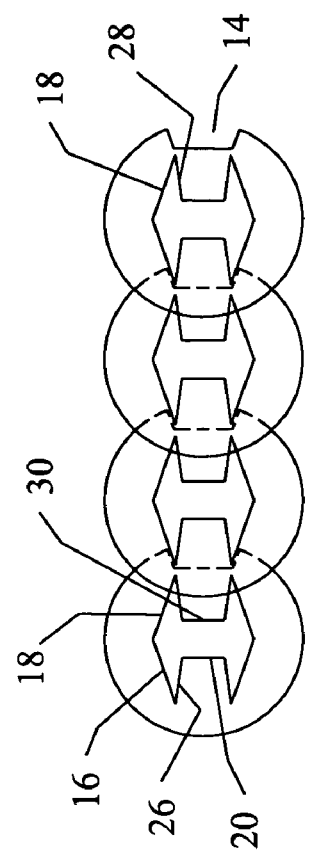
FIG. 11 is a perspective view of an example of several collated fasteners of a shank design similar to the embodiments represented in FIG. 10.

Referring to FIG. 10, in still further embodiments the junction of forward vane external surface 16 and rearward vane external surface 18 forms an external angle greater than 180° but no more than about 270°.

In all of the embodiments of the subject invention, it is preferred that the angles formed by the junction of forward vane internal surfaces 26 with cross-member front face 20, and the junction of rearward vane internal faces 28 with cross-member rear face 30, each be 90° or more, although embodiments where any or all of these angles are acute are not excluded from the subject invention. It is particularly preferred that the junctions of rearward vane internal faces 28 with cross-member rear face 30 form external angles of greater than 90° and less than 150°. Although not essential to the subject invention, it is preferred that the front-to-back thickness of cross-member 10 be at least equal to or, even more preferably, greater than the thickness of any of the vanes.

As mentioned previously, the fastener of the subject invention can further comprise a head 12 fixedly connected to the end of the shank 2 essentially opposite the end to be driven, pressed, pounded, etc, into an object. The head can be any of a variety of shapes, sizes or diameters that will depend upon the tools to be utilized with the fastener, the objects or materials into which the fastener is to be driven or of which the fastener is manufactured, decorative considerations, etc. A person with skill in the art is able to determine the appropriate diameter, thickness, shape, and materials of the head 12 to be formed or affixed to a shank 2 of the subject invention.

In a preferred embodiment, the fastener comprises a substantially round, flattened head 12 formed on the end of shank 2, for example as shown in the Figures. In a further preferred embodiment, the circumference of the head 12 is sufficiently larger than the circumference of the shank to facilitate removal of the shank from an object with a claw hammer or similar device. In a still further preferred embodiment, the head is adequately formed over the central cross-member 10 such that striking, pounding or pressing on or about the center of the head 12 will transmit the force down through the length of the central cross-member 10 to drive the fastener into an object.

Since it is often desirable to use such fasteners in automatic hammers, nail guns, pneumatic hammers, etc., presenting the fasteners in a collated fashion can be helpful. Therefore, the fasteners can be affixed in a collated, or linear, fashion by means known in the art. It can also be preferable to reduce the amount of space between fasteners so that more fasteners can be stored or utilized in a given space. For example, the heads 12 of the fasteners can be positioned in an overlapping fashion to reduce the amount of space between fasteners.

In an alternative embodiment, the head 12 of the fastener can be modified to increase the proximity of the shanks 2 and, thus, the number of fasteners that can be stored in a given space. For example, the head 12 of a fastener can be modified with notch 14 along an edge that accommodates the external shape of shank 2. When the fasteners are positioned with the heads overlapping, each shank 2 is able to fit within the notch 14 of the next fastener in line, putting the shanks 2 in closer proximity to one another.

Figure 9:
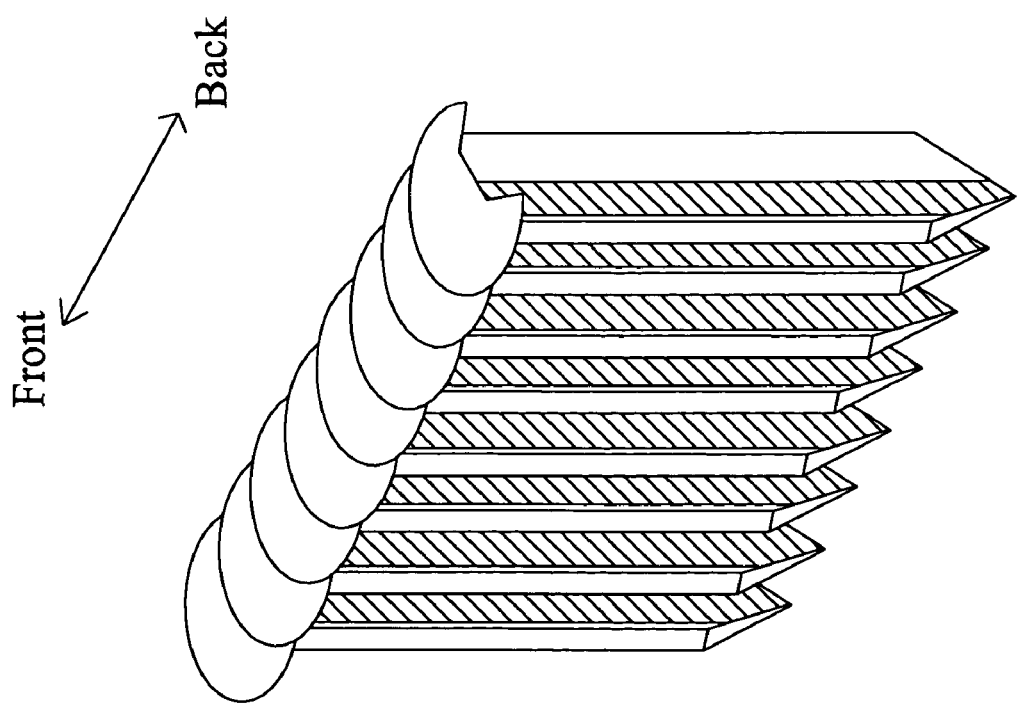
FIG. 9 is a perspective view of an example of several collated fasteners according to the subject invention.

In a preferred embodiment of the subject invention, the head 12 of a fastener is formed to accommodate the forward vanes 6 of the shank 2. In this embodiment, the head 12 is formed to have a notch 14 along the edge, for example, as shown in FIGS. 1B and 5B. In a further preferred embodiment, the notch 14 is located substantially between the rearward vanes 8. In a most preferred embodiment, the rearward vanes 8 are spaced apart at an angle so as to accommodate the width of the forward vanes 6. Examples of such embodiments are represented in FIGS. 4, 8, and 9. Thus, in such embodiments the fasteners can be presented with overlapping heads 12 wherein the forward vanes 6 fit within the notch 14 which places them between the rearward vanes 8 causing the shanks 2 of such collated fasteners to be in a close proximity, for example as shown in FIGS. 4 and 8.

In a further preferred embodiment, the head 12 of the collatable fasteners, as just described above, is sized, shaped, and positioned so that it does not interfere with the ability to strike, press or pound at or about the effective center of the head 12, which, as described previously, transmits force down through the length of the cross-member 10 in order to drive the fastener into an object. An example of this can be seen in FIGS. 4 and 8 wherein the head 12, approximately centered over the cross-member, is configured so that the effective center of the head is accessible.

Alternative embodiments can have the cross-member positioned closer to the front of the shank 2, such that, it would be possible to strike the head 12 off-center and still transmit force along the cross-member 10. In this alternative embodiment, the lengths of the vanes may be adjusted to accommodate the cross-member 10.

From the above description it can be seen that the subject invention provides a fastener requiring less material to manufacture, while still retaining sufficient linear and lateral strength to reduce bending tendencies of the shank, as compared to a round-shank fastener of similar dimension. Certain embodiments of the subject invention are further capable of being collated to reduce volume and increase efficiency when used in a variety of machines and tools.

It should be understood that the examples and embodiments described herein are for illustrative purposes only and that various modifications or changes in light thereof will be suggested to persons skilled in the art and are to be included within the spirit and purview of this application.

The invention claimed is:

1. A fastener device comprising:
an elongated shank having a head at one end and a sharpened tip at the opposite end, the shank having a central planar cross-member with a front face and a rear face;
first and second forward vanes extending from the front face of said cross-member, one at each elongate edge of the front face; and
first and second rearward vanes extending from the rear face of said cross member, one at each elongate edge of the rear face; such that the external surfaces of the first forward vane and the first rearward vane are contiguous and form an obtuse angle, and the external surfaces of the second forward vane and the second rearward vane are contiguous and form an obtuse angle;
wherein the junction of the external surfaces of the first forward and rearward vanes forms an angle of about 155° and the junction of the external surfaces of the second forward and rearward vanes forms an angle of about 155°.

2. A Fastener device comprising:
an elongated shank having a head at one end and a sharpened tip at the opposite end, the shank having a central planar cross-member with a front face and a rear face;
first and second forward vanes extending from the front face of said cross-member, one at each elongate edge of the front face; and
first and second rearward vanes extending from the rear face of said cross-member, one at each elongate edge of the rear face; such that the external surfaces of the first forward vane and the first rearward vane are contiguous and form an obtuse angle, and the external surfaces of the second forward vane and the second rearward vane are contiguous and form an obtuse angle;
wherein said head further comprises a notch positioned between the rearward vanes, the dimensions of said notch being sufficient to accommodate at least a portion of the forward vanes of a second fastener device, such that when the notch accommodates the forward vanes of the second fastener device, the forward vanes of the second fastener device are positioned substantially between the rearward vanes of the first fastener device and the fasteners are thereby collated.

3. A fastener device comprising:
an elongated shank having a flattened head at one end and a sharpened tip at the opposite end, the shank having a central planar cross-member with a front face and a rear face;
two forward vanes extending from the front face of said cross-member, one at each elongate edge of the front face; and
two rearward vanes extending from the rear face of said cross-member, one at each elongate edge of the rear face;
wherein said head further comprises a notch positioned between the rearward vanes, the dimensions of said notch being sufficient to accommodate at least a portion of the forward vanes of a second fastener device, such that when the notch accommodates the forward vanes of the second fastener device, the forward vanes of the second fastener device are positioned substantially between the rearward vanes of the first fastener device and the fasteners are thereby collated.

4. The fastener device of claim 3, wherein the internal surface of at least one of the forward vanes extending from the front face of the cross-member forms an angle of about 90° to about 130° with the front face.

5. The fastener device of claim 4, wherein the internal surface of the forward vane forms an angle with the front face of about 105° to about 115°.

6. The fastener device of claim 3, wherein the internal surface of at least one of the rearward vanes extending from the rear face of the cross-member forms an angle of about 90° to about 155° with the rear face.

7. The fastener device of claim 6, wherein the internal surface of the rearward vane forms an angle with the rear face of about 120° to about 135°.

8. The fastener device of claim 3, wherein the junction of contiguous external surfaces of a first forward vane and a first rearward vane forms an angle of about 90° to about 180°.

9. The fastener device of claim 8, wherein the external surfaces of the first forward and first rearward vanes form an angle of about 155° to about 180°, and wherein the external surfaces of a second forward vane and a second rearward vane form an angle of about 155° to about 180°.

10. The fastener device of claim 3, wherein when the notch of the fastener device accommodates the forward vanes of a second fastener device, the edges of the forward vanes of the second fastener device are in closer proximity to the rear face of the cross-member of the first fastener device than are the edges of the rearward vanes of the first fastener device.

11. The fastener device of claim 3, wherein the external surfaces of the forward vanes, if extended forward, would form an acute angle.

12. The fastener device of claim 11, wherein the internal surfaces of the forward vanes are substantially parallel to each other.

* * * * *

UNITED STATES PATENT AND TRADEMARK OFFICE
CERTIFICATE OF CORRECTION

PATENT NO.       : 7,581,912 B2                                   Page 1 of 1
APPLICATION NO.  : 11/487640
DATED            : September 1, 2009
INVENTOR(S)      : Jeff Lloyd It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 475 days.

Signed and Sealed this

Fourteenth Day of September, 2010

David J. Kappos
*Director of the United States Patent and Trademark Office*